US012692428B2

(12) United States Patent
Martin

(10) Patent No.: US 12,692,428 B2
(45) **Date of Patent: *Jul. 28, 2026**

(54) COMPOSITION AND METHODS FOR INHIBITING CORROSION OF METAL DURING ACIDIZING A WELLBORE IN A SUBTERRANEAN FORMATION FOR FRACKING

(71) Applicant: Roy W. Martin, Naples, FL (US)

(72) Inventor: Roy W. Martin, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/412,927

(22) Filed: Dec. 9, 2025

(65) Prior Publication Data

US 2026/0193524 A1 Jul. 9, 2026

Related U.S. Application Data

(63) Continuation-in-part of application No. 19/382,658, filed on Nov. 7, 2025, which is a continuation-in-part of application No. 19/258,959, filed on Jul. 3, 2025, now Pat. No. 12,497,554, which is a continuation-in-part of application No. 19/208,667, filed on May 15, 2025, which is a continuation-in-part of application No. 19/170,589, filed on Apr. 4, 2025, now Pat. No. 12,473,800.

(60) Provisional application No. 63/773,577, filed on Mar. 18, 2025, provisional application No. 63/771,796, filed on Mar. 14, 2025, provisional application No. 63/742,905, filed on Jan. 8, 2025.

(51) Int. Cl.

| | |
|---|---|
| ***C09K 8/54*** | (2006.01) |
| ***C09K 8/60*** | (2006.01) |
| ***C09K 8/74*** | (2006.01) |
| ***E21B 43/119*** | (2006.01) |
| ***E21B 43/26*** | (2006.01) |
| ***E21B 43/27*** | (2006.01) |

(52) U.S. Cl.

CPC ................ *C09K 8/54* (2013.01); *C09K 8/602* (2013.01); *C09K 8/74* (2013.01); *E21B 43/119* (2013.01); *E21B 43/261* (2013.01); *E21B 43/27* (2020.05); *C09K 2208/32* (2013.01)

(58) Field of Classification Search

CPC ........ C09K 8/54; C09K 8/74; C09K 2208/32; E21B 43/54; E21B 43/27; E21B 43/119; E21B 43/261

See application file for complete search history.

(56) References Cited

U.S. PATENT DOCUMENTS

| | | | | |
|---|---|---|---|---|
| 4,740,320 A | | 4/1988 | Treybig | |
| 5,096,618 A | * | 3/1992 | Frenier | C23F 11/10 507/263 |
| 5,149,773 A | * | 9/1992 | Chiang | C08G 73/0694 525/420 |
| 6,118,000 A | * | 9/2000 | Frenier | C23F 11/149 546/152 |
| 7,179,485 B1 | | 2/2007 | Schneider | |
| 7,902,124 B2 | * | 3/2011 | Ali | C11D 1/90 166/305.1 |
| 10,035,944 B2 | | 7/2018 | Purdy | |
| 10,190,039 B2 | | 1/2019 | Purdy | |
| 10,329,476 B2 | | 6/2019 | Purdy | |
| 10,822,535 B2 | | 11/2020 | Purdy | |
| 10,982,133 B2 | | 4/2021 | Purdy | |
| 11,028,314 B2 | | 6/2021 | Gardner | |
| 11,098,241 B2 | | 8/2021 | Purdy | |

(Continued)

FOREIGN PATENT DOCUMENTS

| | | |
|---|---|---|
| CA | 2629744 | 5/2007 |
| CN | 101792497 | 8/2010 |
| CS | 232317 | 1/1985 |

*Primary Examiner* — Silvana C Runyan

(74) *Attorney, Agent, or Firm* — Jeffrey S. Melcher; Melcher Patent Law PLLC

(57) ABSTRACT

An acid composition for acidizing a wellbore including at least one acid, an alkenylphenone, and a polycyclic diquaternary quinoxaline, and a method using the acid composition to reduce corrosion within a wellbore. The polycyclic diquaternary quinoxaline having the structure:

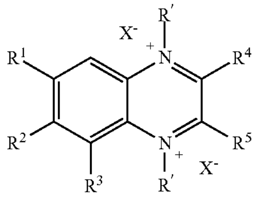

where $X^-$ comprises a counter anion, R' comprises an alkyl aryl group, and $R^1$, $R^2$, $R^3$, $R^4$ and $R^5$ comprise hydrogen or a substitution group, the alkenylphenone the general structure:

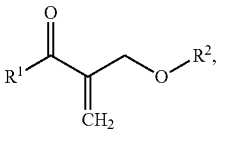

where $R_1$ is an unsubstituted or an inertly substituted aryl having 6 carbon atoms to 10 carbon atoms, and $R_2$ can be a substituted or unsubstituted $C_1$-$C_6$ alkyl group.

17 Claims, 4 Drawing Sheets

(56) References Cited

U.S. PATENT DOCUMENTS

| | | | | |
|---|---|---|---|---|
| 11,130,905 | B2 | 9/2021 | Gardner | |
| 11,155,480 | B2 | 10/2021 | Moloney | |
| 11,155,481 | B2 | 10/2021 | Dhawan | |
| 11,168,246 | B2 | 11/2021 | Purdy | |
| 11,248,166 | B2 | 2/2022 | Purdy | |
| 11,485,902 | B2 | 11/2022 | Purdy | |
| 11,767,375 | B2 | 9/2023 | Gardner | |
| 12,018,210 | B2 | 6/2024 | Purdy | |
| 2014/0116708 | A1 | 5/2014 | Wadekar | |
| 2014/0128295 | A1 | 5/2014 | Wagles | |
| 2021/0108132 | A1 | 4/2021 | Trabelsi | |
| 2022/0145179 | A1 | 5/2022 | Mazumber | |
| 2023/0120003 | A1 | 4/2023 | Purdy | |
| 2024/0110096 | A1 * | 4/2024 | Alamri | C23F 11/161 |
| 2024/0279533 | A1 | 8/2024 | McLoughlin | |
| 2025/0075595 | A1 | 3/2025 | Rabie | |
| 2025/0368895 | A1 * | 12/2025 | Obot | C09K 8/54 |

* cited by examiner

316 Stainless Steel Specimen
Coated with Hydrophobic Film

Galvanized Specimen Coated
with Hydrophobic Film

C1010 low carbon steel Specimen
Coated with Hydrophobic Film

OCP comprising linked PDQ Molecules

COMPOSITION AND METHODS FOR INHIBITING CORROSION OF METAL DURING ACIDIZING A WELLBORE IN A SUBTERRANEAN FORMATION FOR FRACKING

FIELD OF THE INVENTION

The invention relates to compositions and methods for inhibiting corrosion of at least metal in a wellbore during acidizing a wellbore in a subterranean formation for fracking and extraction of oil. The metal can be for example a casing of the wellbore, a wireline, or a perforation tool.

BACKGROUND OF THE INVENTION

Corrosion of metal surfaces of the casing of the wellbore, the wireline, or the perforation tool used for fracking caused by acids during acidizing of the wellbore are common problems. Furthermore, it is common practice to remove the perforation tool from the wellbore prior to acidizing of the wellbore to prevent corrosion of the metal surface of the perforation tool.

U.S. Patent Publication No. 20240279533 (McLoughlin) discloses compositions used to reduce corrosion of a casing of the wellbore, a wireline, or a perforation tool in the wellbore caused by acids during acidizing of the wellbore. The perforation tool can remain in the wellbore during the acidizing of the wellbore. The complete disclosure of this publication is incorporated herein by reference.

U.S. application No. 20140116708A1 discloses a water-in-oil emulsion comprising from 50:50 to 80:20 v/v water phase to oil phase. The disclosure further recites addition of corrosion inhibitors including quaternary compounds, cinnamaldehyde, acetylenic alcohols, intensifiers, cuprous ions, and carboxylic acids (i.e. formic acid).

U.S. Pat. No. 10,822,535 discloses a synthetic acid comprising hydrochloric acid and monoethanol amine at a molar ratio of 15:1 to 3:1 respectively with the preferred molar ratio of 4.1:1 respectively. FIG. 1 of the said patent illustrates the dissolution rate of Indiana limestone comparing the preferred embodiment to 15% hydrochloric acid.

SUMMARY OF THE INVENTION

A new class of corrosion inhibitor composition has been developed for inhibiting corrosion of multiple metallurgies encountered for acidizing a wellbore in a subterranean formation for fracking and extraction of hydrocarbons. The metal can be for example a stainless steel tanker for transporting the acid, a casing of the wellbore, a wireline, or a perforation tool. Furthermore, the corrosion inhibitor composition provides a streamline safe acid that is compatible with stainless steel tankers used to transport the acid to the point-of-use.

One preferred composition that has been assigned a new CAS Registry Number® (CAS RN): 3085265-95-5, and given the CA Index Name: Quinoxalinium, 1,4-bis(phenylmethyl)-, chloride (1:2).

The polycyclic diquaternary quinoxaline (PDQ) combined with the alkenylphenone compounds of the invention provide unexpectedly and surprisingly increased adhesion, protective film uniformity and reduced corrosion rates of multiple metallurgies. Furthermore, the synergistic effects of combining effective amounts of polycyclic diquaternary quinoxaline and alkenyl phenome with acid eliminates the need for traditional intensifiers like potassium iodide, formic acid and antimony trioxide to name a few.

Without being bound by theory, it is believed the alkenylphenone chemically adsorbs to the metal surface thereby conditioning it by providing a film well suited for adsorption of the PDQ. The high charge density PDQ is attracted to the partial negative charged carbonyl groups distributed throughout the film. The PDQ's Gemini (twin) quaternary groups coupled with the geometric structure of the molecule improve the adhesion and uniform distribution of the hydrophobic film across the metal surfaces, thereby enhancing corrosion inhibition.

Quaternary surfactants exemplified by quaternary pyridinium and quaternary quinolinium are desirable corrosion inhibitors for acidizing compositions. Because the metal (i.e. carbon steel) surface in acid solutions are etched of oxide films, the surfaces take on a cationic charge due to the presence of iron. While chloride anions in hydrochloric acid impart a bridging anionic charge between the corrosion inhibitor and the steel surface, intensifiers are typically applied to transition the surface to an anionic charge thereby making it suitable for adsorption of the quaternary surfactant. Examples of suitable intensifiers include: iodide, iodate, bromide, formaldehyde, acetaldehyde, formic acid, antimony, stannous, bismuth and germanium.

Halide "Intensifiers" like bromide and iodide further increase the attraction of the quaternary corrosion inhibitor Cl<Br<I with iodide ions possessing higher atomic mass and lower electronegativity than bromide or chloride.

The addition of halides enhances the adsorption of the quaternary corrosion inhibitor. However, the halides function as a mediary between the metal (steel) surfaces and quaternary corrosion inhibitor. This relationship can be represented as Quat-Halide-Fe interactions with the halide being the mediary (bridging ion) that ties them together.

Furthermore, imperfections (interruptions) in coverage of the steel substrate resulting from the geometry of the quaternary hydrophobic structure expose the surface to the corrosive acid solution resulting in: corrosion, dissolution of iron ions and evolution of hydrogen gas. To combat the persistent deterioration and subsequent loss of integrity of the protective film, a residual (reservoir) of corrosion inhibitor can be utilized to reestablish the film.

In order to mitigate the inherent weaknesses and subsequent metal losses resulting from these limitations, a new novel corrosion inhibitor chemistry is required.

This novel invention improves corrosion inhibition of metal (steel) during acidizing of the wellbore increasing the life of the wireline and perforating gun, thereby allowing increased perforating cycles of said equipment. Furthermore, due to the corrosion inhibition of multiple metallurgies, the invention provides for the ability to transport the inhibited acid solution in stainless steel tankers, where existing inhibited acids require lined tankers which can compromise the logistics and increase transportation cost.

The novel corrosion inhibitor comprises polycyclic diquaternary quinoxaline (PDQ). Polycyclic describes the presence of two or more cyclic groups in the PDQ structure. The term polycyclic is not limited to the cyclic groups being bonded together as exemplified in the non-limiting examples naphthalene and anthracene. However, if desired the polycyclic structure can be bonded together as in the case where chloromethyl naphthalene is used in the synthesis of the PDQ.

Disclosed are novel compositions and methods for inhibiting corrosion of metal in a wellbore during acidizing a wellbore in a subterranean formation for fracking and extraction of oil and gas. The disclosed compositions exhibit unexpected and surprisingly superior corrosion inhibition of metal surfaces compared to the prior art corrosion inhibitor compositions and methods. Application of the disclosed invention provides surprising and unexpectedly significant economic and performance advantages over the prior art.

Objectives

In some embodiments, a method of operating a wellbore includes placing a wireline including a perforating gun in a wellbore, the wellbore extending through an earth formation and including a casing extending through the earth formation, the wireline including zinc, discharging the perforating gun to form perforations through the casing and in the earth formation surrounding the casing proximate the at least one perforating gun, flowing a fracturing fluid including one or more proppants through the perforations and into the earth formation to open fractures in the earth formation with the one or more proppants, introducing a flushing fluid into the wellbore to displace the fracturing fluid, and flowing a corrosion inhibitor composition into the wellbore and through the perforations at least one of before the fracturing fluid, with the fracturing fluid, or with the flushing fluid. The corrosion inhibitor composition includes an alkenylphenone, and a polycyclic diquaternary quinoxaline.

In some embodiments, a method for inhibiting corrosion of a component comprising zinc, copper, aluminum, nickel, chromium, iron alloys thereof, or a combination thereof in the presence of an acid includes providing an acid composition in contact with a surface of the component. The corrosion inhibitor composition includes an alkenylphenone and a polycyclic diquaternary quinoxaline.

In some embodiments, a method for inhibiting corrosion of a component comprising one or more of zinc, copper, aluminum, nickel, or chromium, or alloys thereof includes contacting a surface of the component, with a corrosion inhibitor composition comprising an alkenylphenone, a polycyclic diquaternary quinoxaline. The corrosion inhibitor composition includes about 0.25 to 2 moles of polycyclic diquaternary quinoxaline (PDQ) for every 1 mole of alkenylphenone.

The corrosion inhibitor composition includes about 0.5 parts by weight to about 5.0 parts by weight of the polycyclic diquaternary quinoxaline for every about 1.0 part by weight of the alkenylphenone. More preferred, the corrosion inhibitor composition includes about 0.5 parts by weight to about 2 parts by weight of the polycyclic diquaternary quinoxaline for every about 1.0 part by weight of the alkenylphenone.

Certain embodiments of the present disclosure include a method for inhibiting corrosion of a component that includes zinc, copper, aluminum, or chromium, or alloys thereof, or a combination thereof, in the presence of an acid. The method includes providing an acid composition in contact with a surface of the component. The acid composition includes a corrosion inhibitor composition that includes an alkenylphenone with the structure:

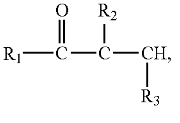

Wherein $R_1$ is an unsubstituted or an inertly substituted aryl having 6 carbon atoms to 10 carbon atoms, and $R_2$ and $R_3$ individually include hydrogen, a halogen, or an inertly substituted aliphatic of 2 carbon atoms to 12 carbon atoms, and unsubstituted or an inertly substituted aryl having 6 carbon atoms to 10 carbon atoms.

Oligomers of polycyclic diquaternary quinoxaline have been assigned a new CAS Registry Number® (CAS RN): 3085536 May 3, and given the CA Index Name: Quinoxalinium, 1,4-bis(phenylmethyl)-, chloride (1:2) homopolymer.

The OCPs comprise oligomers and/or co-oligomers of the polycyclic diquaternary quinoxaline corrosion inhibitors. The number of carbon-carbon bonds (C—C) that link the polycyclic diquaternary quinoxaline (precursor used to make the OCP) can be controlled by regulating the molar ratio of nitrite to precursor as well as controlling the rate of nitrous acid production. For example, higher molar ratios of nitrite will support more coupling resulting in higher molecular weight OCPs. Furthermore, applying acid such as hydrochloric acid quickly induces localized high concentrations of nitrous acid, which in turn induces rapid coupling of the quaternary aromatic corrosion inhibitors as illustrated by the rapid, almost instantaneous color transition disclosed in some of the examples. It is presumed that these variables can expectedly influence the performance of the OCPs produced. Therefore, optimization of synthesis methods can be conducted to produce the desired performance of the OCPs with respect to corrosion inhibition.

EMBODIMENTS

In the first embodiment is disclosed a corrosion inhibitor composition for acidizing a wellbore, the corrosion inhibitor comprising:

an effective amount of an alkenylphenone;

a polycyclic diquaternary quinoxaline having the general structure:

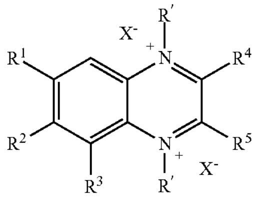

where $X^-$ comprises a counter anion,

R' comprises an alkyl aryl group, and $R^1$, $R^2$, $R^3$, $R^4$ and $R^5$ comprise hydrogen or a substitution group, and wherein the polycyclic diquaternary quinoxaline is the result of reacting quinoxaline with a supra-stoichiometric amount of cyclic halide.

The corrosion inhibitor composition of the first embodiment, wherein the supra-stoichiometric amount of cyclic halide is greater than 1.2.

The corrosion inhibitor composition according to the first embodiment, wherein the alkenylphenone having the general structure:

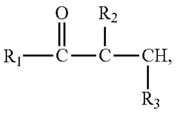

Wherein $R_1$ is an unsubstituted or an inertly substituted aryl having 6 carbon atoms to 10 carbon atoms, and $R_2$ and $R_3$ individually include hydrogen, a halogen, or an inertly substituted aliphatic of 2 carbon atoms to 12 carbon atoms, and unsubstituted or an inertly substituted aryl having 6 carbon atoms to 10 carbon atoms.

The corrosion inhibitor composition according to the first embodiment, wherein the alkenylphenone having the general structure:

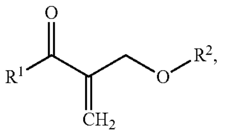

Where $R_1$ is an unsubstituted or an inertly substituted aryl having 6 carbon atoms to 10 carbon atoms, and $R_2$ can be a substituted or unsubstituted $C_1$-$C_6$ alkyl group.

The corrosion inhibitor composition according to the first embodiment, wherein the composition comprises from about 0.25 to 2 moles of polycyclic diquaternary quinoxaline (PDQ) for every 1 mole of alkenylphenone.

The corrosion inhibitor composition according to the first embodiment, wherein the composition comprises from about 0.5 parts by weight to about 5.0 parts by weight of the polycyclic diquaternary quinoxaline for every about 1.0 part by weight of the alkenylphenone.

The polycyclic diquaternary quinoxaline in accordance with the first embodiment, wherein the alkyl aryl group is selected from at least one of benzyl, benzoyl, vinylbenzyl and methyl naphthalene.

The polycyclic diquaternary quinoxaline in accordance with the first embodiment, wherein $R^1$, $R^2$, $R^3$, $R^4$ and $R^5$ comprise substitution groups selected from: halo, alkyl, aryl and alkyl aryl.

The polycyclic diquaternary quinoxaline according to the first embodiment, wherein the counter anion is selected from at least one of chloride, bromide, iodide.

The polycyclic diquaternary quinoxaline in according with the first embodiment, wherein the counter anion is iodide.

The corrosion inhibitor composition in accordance with the first embodiment, wherein the polycyclic diquaternary quinoxaline comprises dibenzyl diquaternary quinoxaline having the general structure:

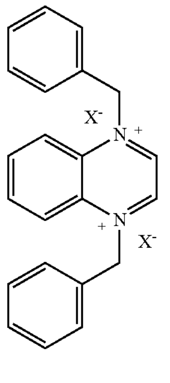

Where $X^-$ comprises a counter anion.

The polycyclic diquaternary quinoxaline according to the first embodiment, wherein the polycyclic diquaternary quinoxaline is the result of:

combining and mixing in a vessel a solvent, quinoxaline and a supra-stoichiometric amount of cyclic halide;

the reaction between the quinoxaline and cyclic halide results in the formation of the polycyclic diquaternary quinoxaline, and wherein the supra-stoichiometric amount of cyclic halide is greater than a 1.2:1 molar ratio of cyclic halide to quinoxaline.

In the second embodiment is disclosed an acid composition for acidizing a wellbore, the composition comprising:

at least one acid; an effective amount of an alkenylphenone, and and an effective amount of polycyclic diquaternary quinoxaline;

the polycyclic diquaternary quinoxaline having the general structure:

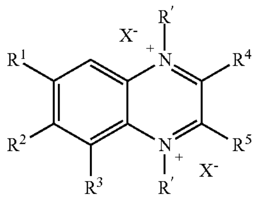

where $X^-$ comprises a counter anion,

R' comprises an alkyl aryl group, and $R^1$, $R^2$, $R^3$, $R^4$ and $R^5$ comprise hydrogen or a substitution group.

The acid composition according to the second embodiment, wherein the alkenylphenone having the general structure:

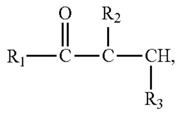

Where $R_1$ is an unsubstituted or an inertly substituted aryl having 6 carbon atoms to 10 carbon atoms, and $R_2$ and $R_3$ individually include hydrogen, a halogen, or an inertly substituted aliphatic of 2 carbon atoms to 12 carbon atoms, and unsubstituted or an inertly substituted aryl having 6 carbon atoms to 10 carbon atoms.

The acid composition according to the second embodiment, wherein the alkenylphenone having the general structure:

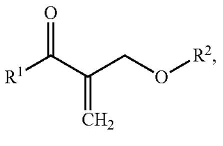

Where $R_1$ is an unsubstituted or an inertly substituted aryl having 6 carbon atoms to 10 carbon atoms, and $R_2$ maybe a substituted or unsubstituted $C_1$-$C_6$ alkyl group.

The corrosion inhibitor composition according to the second embodiment, wherein the composition comprises from about 0.25 to 2 moles of polycyclic diquaternary quinoxaline (PDQ) for every 1 mole of alkenylphenone.

The corrosion inhibitor composition according to the second embodiment, wherein the composition comprises from about 0.5 parts by weight to about 5.0 parts by weight of the polycyclic diquaternary quinoxaline for every about 1.0 part by weight of the alkenylphenone. More preferred, the corrosion inhibitor composition includes about 0.5 parts by weight to about 2 parts by weight of the polycyclic diquaternary quinoxaline for every about 1.0 part by weight of the alkenylphenone.

The polycyclic diquaternary quinoxaline according to the second embodiment, wherein the alkyl aryl group is selected from at least one of benzyl, benzoyl, vinylbenzyl and methyl naphthalene.

The polycyclic diquaternary quinoxaline according to the second embodiment, wherein $R^1$, $R^2$, $R^3$, $R^4$ and $R^5$ comprise substitution groups selected from: halo, alkyl, aryl and alkyl aryl.

The corrosion inhibitor composition according to the second embodiment, further comprising and intensifier selected from at least one of an iodide donor, an aldehyde and formic acid.

The corrosion inhibitor composition according to the second embodiment, wherein the counter anion is selected from at least one of chloride, bromide, iodide or hydroxide.

The corrosion inhibitor composition according to the second embodiment, wherein the counter anion comprises iodide.

The corrosion inhibitor composition according to the second embodiment, further comprising an intensifier selected from at least one of a bromide donor, formaldehyde, antimony donor, bismuth donor, germanium donor, stannous donor and glyoxal.

The corrosion inhibitor composition in accordance with the second embodiment, wherein the polycyclic diquaternary quinoxaline comprises dibenzyl diquaternary quinoxaline having the general structure:

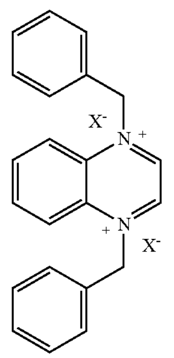

Where $X^-$ comprises a counter anion.

The corrosion inhibitor composition in accordance with the second embodiment, further comprising a surfactant.

The corrosion inhibitor composition in accordance with the second embodiment, wherein the surfactant is selected from at least one of a nonionic surfactant, amphoteric surfactant and anionic surfactant.

The composition in accordance with the second embodiment, wherein the acid comprises about 15 wt % HCl.

The composition according to the second embodiment, wherein the acid comprises about 5 wt % to 28 wt %.

The composition in accordance with the second embodiment, wherein the intensifier comprises an iodide donor.

The composition in accordance with the second embodiment, wherein the polycyclic diquaternary quinoxaline ranges from about 250 ppm to 10000 ppm as active polycyclic diquaternary quinoxaline.

The composition in accordance with the second embodiment, wherein the composition is diluted with water at the point-of-use to achieve a ratio of composition and water of 1:1 respectively.

The composition in accordance with the second embodiment, wherein the composition is diluted with water at the point-of-use to achieve a ratio of composition and water of 1:2 respectively.

The composition in accordance with the second embodiment, wherein the surfactant comprises a nonionic surfactant.

The composition in accordance with the second embodiment, wherein the surfactant comprises an anionic surfactant.

The composition in accordance with the second embodiment, wherein the anionic surfactant is selected from at least one of an alkyl ether sulfates, alkyl sulfates, alkyl sulfonates, alkyl benzene sulfonates, alkyldiphenyloxide disulfonate and phosphate ester.

The composition in accordance with the second embodiment, wherein the acid comprises a synthetic acid.

The composition in accordance with the second embodiment, wherein the polycyclic diquaternary quinoxaline is the result of:

combining and mixing in a vessel a solvent, quinoxaline and a supra-stoichiometric amount of cyclic halide;

the reaction between the quinoxaline and cyclic halide results in the formation of the polycyclic diquaternary quinoxaline, and wherein the supra-stoichiometric amount of cyclic halide is greater than a 1.2:1 molar ratio of cyclic halide to quinoxaline.

The composition in accordance with the second embodiment, wherein the polycyclic diquaternary quinoxaline is the result of reacting an O-phenylenediamine with a glyoxal compound to produce the quinoxaline.

The composition in accordance with the second embodiment, further comprising a quaternary aromatic phosphonium selected from at least one of benzyltriphenylphosphonium salts and tetraphenylphosphonium salts.

The composition in accordance with the second embodiment, further comprising at least one of a quaternary quinolinium and quaternary pyridinium.

In the third embodiment is disclosed:

a method of forming a hydrocarbon-bearing formation for a stimulation operation, the method comprising the steps:

assessing at least a first location and a second location for perforation of a casing in a wellbore;

inserting a bottom hole assembly into the well-bore;

the bottom hole assembly comprising a plug and a perforation tool and the bottom hole assembly being connected to a wireline;

injecting an acidic composition into the wellbore;

wherein the acidic composition is in direct contact with the perforation tool, the wireline and the casing;

positioning and setting the plug in the wellbore at a position downhole but proximate to the first location;

positioning the perforation tool at the first location;

perforating the casing at the first location with the perforation tool thereby creating a first perforated area and a first cementitious debris;

allowing the acidic composition to come into contact with the first perforated area and the first cementitious debris for a predetermined period of time to prepare the formation for the stimulation operation;

moving the perforation tool up-hole to the second location;

perforating the casing at the second location with the perforation tool thereby creating a second perforated area and a second cementitious debris;

allowing the acidic composition to come into contact with the second perforated area and the second cementitious debris for a predetermined period of time to prepare the formation for the stimulation operation;

removing the perforation tool from the wellbore;

wherein the acid composition comprises an acid and a corrosion inhibitor composition, the corrosion inhibitor composition comprising:

an effective amount of an alkenylphenone, and an effective amount of polycyclic diquaternary quinoxaline;

the polycyclic diquaternary quinoxaline having the general structure:

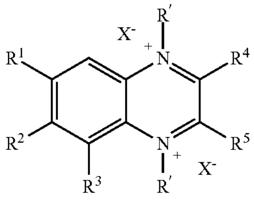

where $X^-$ comprises a counter anion,

R' comprises an alkyl aryl group, and $R^1$, $R^2$, $R^3$, $R^4$ and $R^5$ comprise hydrogen or a substitution group.

The corrosion inhibitor composition according to the third embodiment, wherein the alkenylphenone having the general structure:

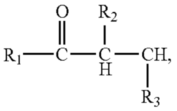

Wherein $R_1$ is an unsubstituted or an inertly substituted aryl having 6 carbon atoms to 10 carbon atoms, and $R_2$ and $R_3$ individually include hydrogen, a halogen, or an inertly substituted aliphatic of 2 carbon atoms to 12 carbon atoms, and unsubstituted or an inertly substituted aryl having 6 carbon atoms to 10 carbon atoms.

The acid composition according to the third embodiment, wherein the alkenylphenone having the general structure:

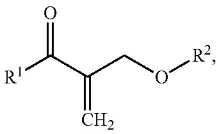

Where $R_1$ is an unsubstituted or an inertly substituted aryl having 6 carbon atoms to 10 carbon atoms, and $R_2$ maybe a substituted or unsubstituted $C_1$-$C_6$ alkyl group.

The corrosion inhibitor composition according to the third embodiment, wherein the corrosion inhibitor composition inhibits corrosion of zinc, copper, aluminum, nickel, chromium, iron alloys thereof, or a combination thereof, in the presence of an acid.

The corrosion inhibitor composition according to the third embodiment, wherein the corrosion inhibitor composition inhibits corrosion of at least one of the wireline and perforating tool.

The corrosion inhibitor composition according to the third embodiment, wherein the alkyl aryl group is selected from at least one of benzyl, benzoyl, vinylbenzyl and methyl naphthalene.

The corrosion inhibitor composition according to the third embodiment, wherein $R^1$, $R^2$, $R^3$, $R^4$ and $R^5$ comprise substitution groups selected from: halo, alkyl, aryl and alkyl aryl.

The corrosion inhibitor composition according to the third embodiment, wherein the counter anion is selected from at least one of chloride, bromide, iodide or hydroxide.

The corrosion inhibitor composition according to the third embodiment, wherein the counter anion comprises iodide.

The corrosion inhibitor composition according to the third embodiment, further comprising an intensifier selected from at least one of an iodide donor, bromide donor, formaldehyde, formic acid, antimony donor, bismuth donor, germanium donor, stannous donor and glyoxal.

The corrosion inhibitor composition in accordance with the third embodiment, wherein the polycyclic diquaternary quinoxaline comprises dibenzyl diquaternary quinoxaline having the general structure:

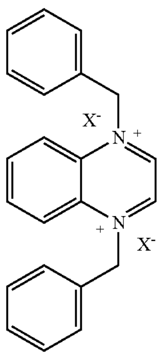

Where $X^-$ comprises a counter anion.

The corrosion inhibitor composition in accordance with the third embodiment, further comprising a surfactant.

The corrosion inhibitor composition in accordance with the third embodiment, further comprising a surfactant selected from at least one of a nonionic surfactant, amphoteric surfactant and anionic surfactant.

The corrosion inhibitor composition according to the third embodiment, further comprising a surfactant selected from an ethoxylate alcohols having 16 to 18 carbon alkyl chain.

The corrosion inhibitor composition in accordance with the third embodiment, wherein the acid comprises about 15 wt % HCl.

The corrosion inhibitor composition in accordance with the third embodiment, wherein the polycyclic diquaternary quinoxaline ranges from about 250 ppm to 10000 ppm as active polycyclic diquaternary quinoxaline.

The corrosion inhibitor composition in accordance with the third embodiment, wherein the composition is diluted with water at the point-of-use to achieve a ratio of composition and water of 1:1 respectively.

The corrosion inhibitor composition in accordance with the third embodiment, wherein the composition is diluted with water at the point-of-use to achieve a ratio of composition and water of 1:2 respectively.

The corrosion inhibitor composition in accordance with the third embodiment, wherein the acid comprises a synthetic acid.

The corrosion inhibitor composition in accordance with the third embodiment, wherein the polycyclic diquaternary quinoxaline is the result of:

combining and mixing in a vessel a solvent;

adding quinoxaline to form a quinoxaline solution;

adding to the solution of quinoxaline a supra-stoichiometric amount of cyclic halide, and wherein the reaction between the quinoxaline and cyclic halide results in the formation of the polycyclic diquaternary quinoxaline.

The corrosion inhibitor composition in accordance with the third embodiment, wherein the quinoxaline is the result of reacting an O-phenylenediamine with a glyoxal compound.

In the fourth embodiment is disclosed an inhibited acid composition compatible with stainless steel tankers for transporting the inhibited acid composition, the composition comprising:

an acid;

an effective amount of alkenylphenone;

an effective amount of polycyclic diquaternary quinoxaline, and wherein the inhibited acid composition is transported in stainless steel tankers.

The composition in accordance with the fourth embodiment, wherein the polycyclic diquaternary quinoxaline having the general structure:

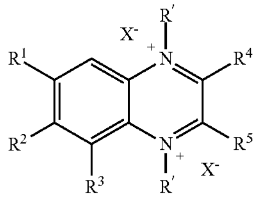

where $X^-$ comprises a counter anion,

R' comprises an alkyl aryl group, and $R^1$, $R^2$, $R^3$, $R^4$ and $R^5$ comprise hydrogen or a substitution group.

The acid composition according to the fourth embodiment, wherein the alkenylphenone having the general structure:

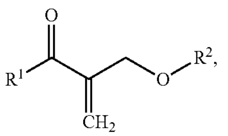

Where $R_1$ is an unsubstituted or an inertly substituted aryl having 6 carbon atoms to 10 carbon atoms, and $R_2$ maybe a substituted or unsubstituted $C_1$-$C_6$ alkyl group.

DETAILED DESCRIPTION OF THE INVENTION

The following terms will be used throughout the specification and will have the following meanings unless otherwise indicated.

"A" or "an" means "at least one" or "one or more" unless otherwise indicated.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

When referring to a group, "at least one . . . and . . . " in the specification and claims is synonymous with "and/or". For example, "at least one of A, B and C" means A alone, B alone, C alone, or any combination of A, B or C.

"wt. %" is based on the total weight of the composition unless otherwise stated.

Definitions

Various compositions and methods of the invention are described below. Although particular compositions and methods are exemplified herein, it is understood that any of a number of alternative compositions and methods are applicable and suitable for use in practicing the invention.

As used herein, "ambient temperature" is used to describe the ability to carry out the oxidative coupling reaction without applying heat energy to elevate the temperature. Ambient temperature comprising typical room temperature (68-76° F.) allows the reaction to proceed. Reference to ambient temperature is not used to limit the range of temperature, it is only used to highlight the ability to carry out the oxidative coupling reaction without applying heat.

As used herein, "wellbore" describes the drilled channel (hole) within a subterranean formation that is lined with a metal casing (pipe).

Figure 1:
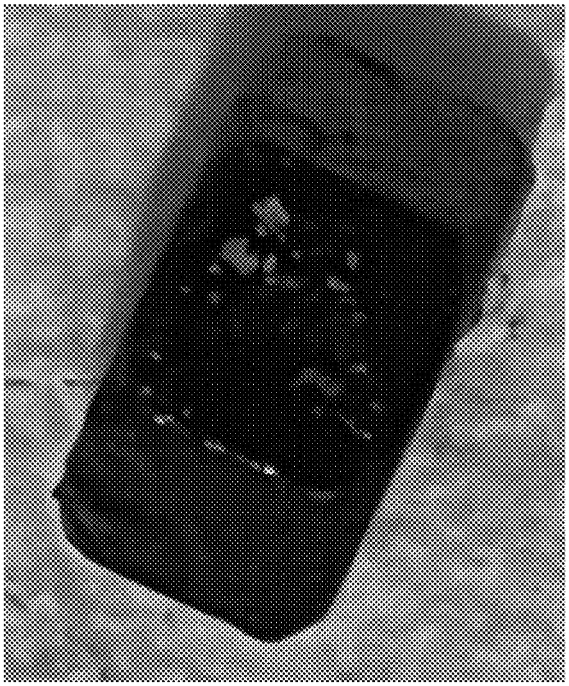
FIG. 1 illustrates a uniform hydrophobic film coating on a 316 stainless steel specimen after 4 hours at 208° F. of exposure in 15 wt % HCl treated with 5 gpt Phalanx II and 5 gpt Conditioner (approximately a 1:3 molar ratio respectively).
Figure 2:
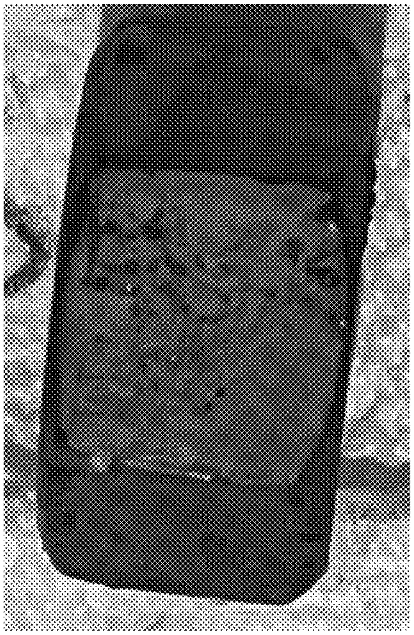
FIG. 2 illustrates a uniform hydrophobic film coating on a Hot Dipped Galvanized specimen after 4 hours at 208° F. of exposure in 15 wt % HCl treated with 5 gpt Phalanx II and 5 gpt Conditioner.

As used herein, "oxidative coupling product" also referred to as "OCP" and/or "OCPs" describes the product produced from an oxidative coupling reaction that results in a condensation product between two or more molecules of quaternary corrosion inhibitors selected from at least one of quaternary pyridinium and quaternary quinolinium and their various combinations (molar or wt % ratios). The said pyridinium and quinolinium may further comprise alkyl and/or aryl derivatives as illustrated in FIG. 1. The oxidative coupling product comprises at least one quaternary function group but preferably comprise two or more quaternary functional groups. Furthermore, when higher molar ratios of nitrite donor are applied during the production of OCPs, additional linking between the reactants occur resulting in an OCP comprising more than two bonded (linked) oxidative coupling reactants. For example, an OCP comprising a quaternary pyridinium-quinolinium complex may undergo additional oxidative coupling to produce a quaternary pyridinium-quinolinium-pyridinium complex. These higher molecular weight OCPs can form a tar like precipitate that is readily dissolved in an appropriate solvent system such as glycol ethers.

As used herein, "quaternary pyridinium-pyridinium" describes the general family of the OCP resulting from the oxidative coupling reaction. Use of the description quaternary pyridinium-pyridinium does not limit the molecular structure to two linked pyridinium molecules, neither does it limit the quaternary functionality to one quaternary group. In fact, the resulting OCP product may comprise multiple molecules having two or more carbon-carbon bonded (oligomer) quaternary aromatic corrosion inhibitors thereby containing three or more pyridinium molecules and multiple quaternary functional groups.

As used herein, "quaternary pyridinium-quinolinium" describes the general family of the OCP resulting from the oxidative coupling reaction. Use of the description quaternary pyridinium-quinolinium does not limit the molecular structure to one quinolinium molecule linked to a pyridinium molecule. In fact, the resulting OCP product may comprise multiple molecules having two or more carbon-carbon bonded (co-oligomer) quaternary aromatic corrosion inhibitors thereby containing three or more pyridinium and/or quinolinium molecules and multiple quaternary functional groups.

As used herein, "quaternary quinolinium-quinolinium" describes the general family of the OCP resulting from the oxidative coupling reaction. Use of the description quaternary quinolinium-quinolinium does not limit the molecular structure to two linked quinolinium molecules. In fact, the resulting OCP product may comprise multiple molecules having two or more carbon-carbon bonded (oligomer) quaternary aromatic corrosion inhibitors thereby containing three or more pyridinium molecules and multiple quaternary functional groups.

As used herein, "oxidative coupling reaction" describes the mechanism that chemically bonds (couples) two or more molecules of quaternary aromatic corrosion inhibitors selected from at least one of quaternary quinolinium and quaternary pyridinium resulting in the production of a corrosion inhibiting oxidative coupling product comprising at least one of an oligomer and co-oligomer or said quaternary aromatic corrosion inhibitors. Without being bound by theory, the oxidative coupling product is believed to be the condensation product of the quaternary corrosion inhibitors resulting from oxidative coupling initiated by the decomposition products of nitrous acid exemplified by free radical nitric oxide (NO•), nitrosonium ($NO^+$) and the like.

As used herein, "nitrous acid initiates an oxidative coupling reaction" describes the use of in-situ generated nitrous acid to initiate the oxidative coupling reaction. Without being bound by theory, it is believed at least one of nitrous acid and/or the decomposition products of nitrous acid exemplified by nitric oxide (NO•), nitrosonium ($NO^+$) initiate the coupling reaction resulting in a condensation product comprising a higher molecular weight quaternary oxidative coupling product.

As used herein "based on active OCP" refers to the amount of oxidative coupling product in the formulation used as a corrosion inhibitor. For example, if the formulated product comprises 20 wt % OCPs, to achieve 1000 ppm based on active OCP, the amount of the formulated product added to the acidizing solution would be 5000 ppm formulated product.

As used herein "acid composition" and "acidizing composition" can be used interchangeably.

As used herein, "metal" is used to describe carbon steel, carbon steel alloys and stainless steel that comes in contact with the aqueous acidizing composition during the acidizing of the wellbore in fracking operation. Examples of such metallic surfaces include the steel casing lining the wellbore, the wireline and the perforating gun.

As used herein, "gpt" means gallons per thousand, and specifically pertains to the dosage of corrosion inhibiting composition (gallons) added per 1000 gallons of aqueous acidizing composition.

As used herein, "iodide donor" describes a compound that comprises an iodide atom. Non-limiting examples of iodide donors include: sodium iodide, potassium iodide, ammonium iodide, cupper iodide, iodine and iodate salts.

As used herein, "bromide donor" describes at source of bromide exemplified by the non-limiting examples: sodium bromide, potassium bromide, lithium bromide, ammonium bromide and the like.

As used herein, "effective amount" describes the concentration of a chemical to achieve the target effect. Non-limiting examples include: an effective amount of polycyclic diquaternary quinoxaline is the amount needed to achieve an acceptable (targeted) corrosion rate; an effective amount of nitrous acid is the concentration required to produce the target amount of oxidative coupling product; an effective amount of oxidative coupling product is the concentration required to achieve an acceptable (targeted) corrosion rate, and the like.

As used herein, "oligomer" described two or more polycyclic diquaternary quinoxaline molecules coupled together by a carbon-carbon (C—C) bond.

As used herein, "co-oligomer" described at least one polycyclic diquaternary quinoxaline coupled by a carbon-carbon (C—C) bond to at least one of a quaternary quinolinium, quaternary pyridinium and quaternary aromatic phosphonium compound.

As used herein "derivatives" as it pertains to "oligomer" and "co-oligomer" describes variations in the structure of the oxidation coupling product as a result of the presence of residuals or additives having cyclic structures that couple with the oligomers and co-oligomers. For example, residual quinolinium resulting from the production of quaternary quinolinium can couple with quaternary quinolinium during the oxidative coupling reactions thereby resulting in a derivative of the oligomer quaternary quinolinium-quinolinium complex.

As used herein, "quaternary aromatic phosphonium" comprises a quaternary phosphonium having at least one aromatic group exemplified by the non-limiting examples benzyl and phenyl. Preferably there are two or more aromatic groups comprising the quaternary aromatic phosphonium compound. Non-limiting examples of preferred quaternary aromatic phosphonium compounds include tetraphenyl phosphonium salts and benzyl triphenyl phosphonium salts.

As used herein, "point-of-use" describes the location at which the acidizing composition is applied to the wellbore. The point-of-use is the location where the concentrated composition for acidizing a wellbore is diluted with water at a ratio from about 1:1 to 1:2 acidizing composition to water respectively thereby reducing the freight, storage and chemical cost of acidizing the wellbore.

As used herein, "water" having the chemical formula $H_2O$ may comprise various concentrations of mineral salts (e.g. brine, produced water) and other additives and contaminants that are dissolved or dispersed in the water resulting in an aqueous solution.

As used herein, "cyclic halide" is a halogenated (Cl, Br, I) alkyl aryl compound that adds a cyclic group during the quaternization of the amine group. Nonlimiting examples of cyclic halides include: benzyl chloride, benzyl bromide, benzyl iodide, benzoyl chloride and chloromethyl naphthalene.

Acids

Suitable acid can be selected from synthetic acids, mineral acids, organic acids and/or any combination thereof, to be for example the acid is at least one mineral acid. Examples of the acid concentration in the aqueous acidizing composition range between about 5 to 28 wt %, more preferably about 7.5 to 20 wt % and most preferably about 10 to 15 wt %. Suitable acid can be selected from mineral acids, organic acids and/or any combination thereof. Non-limiting examples of mineral acids include hydrochloric acid, sulfuric acid, hydrofluoric acid, nitric acid and the like.

Acids may further comprise synthetic acids which are mineral acid (i.e. hydrochloric acid) stabilized using retarding agents. Non-limiting examples of organic acids include formic acid, acetic acid, citric acid, lactic acid and the like.

Retarding agents are organic nitrogen bearing compounds that form adducts with the acid to slow the release of the hydrogen and retard the aggressive corrosive nature of the acid. For example, urea combined with hydrochloric acid forms urea hydrochloride which dramatically retards the reactivity of the acid solution and suppresses the toxic vapors. Numerous retarding agents have been disclosed in the prior art including amino acids (e.g. glycine, lysine etc.), amino alcohols (e.g. monoethanolamine, diethanolamine etc.) and amines such as morpholine and dieethylhydroxlamine. These are non-limiting examples and the limited examples is not intended to limit the viable retarding agents available. Prior art can be referenced for a more comprehensive list of available retarding agents.

Preferred retarding agents are thermally stable nitrogen bearing compounds that can handle greater than 150° C. in and aqueous solution without undergoing thermal decomposition. Non-limiting examples of thermally stable nitrogen bearing compounds include glycine, aspartate, asparagine, cysteine, glutamate, glutamine, arginine, histidine and hydrazine. The thermally stable nitrogen bearing compounds can be combined with hydrochloric acid to produce adducts that reduce the aggressive corrosion of the hydrochloric acid thereby extending the life of the synthetic acid when applied to the wellbore and reducing the potential damage to the formation near the wellbore. Limestone testing demonstrates the dramatic reduction in the dissolution of limestone especially when the synthetic acid is combined with the OCPs disclosed.

The molar ratio of thermally stable nitrogen bearing compounds to hydrochloric acid range from 1:8 to 1:1, more preferred 1:6 to 1:1.5 and most preferred 1:4 to 1:2 respectively.

Surfactants comprise molecules that can form micelles and are preferably nonionic, anionic and amphoteric. Cationic surfactants could be used sparingly but it has been found higher concentrations interfere with the cationic charged corrosion inhibitor reducing corrosion inhibitor performance.

Nonionic Surfactants are Preferably Ethoxylated Alcohols.

Anionic surfactants are selected from at least one of an alkyl ether sulfates, alkyl sulfates, alkyl sulfonates, alkyl benzene sulfonates, alkyldiphenyloxide disulfonate and phosphate esters. Phosphate esters preferably have greater than or equal to 3 moles of ethylene oxide (EO), more preferred greater than or equal to 6 moles of EO and most preferred greater than or equal to 9 moles of EO.

Alkenylphenones having the general structure:

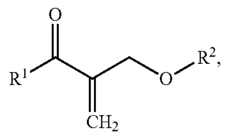

Where $R_1$ is an unsubstituted or an inertly substituted aryl having 6 carbon atoms to 10 carbon atoms, and $R_2$ maybe a substituted or unsubstituted $C_1$-$C_6$ alkyl group.

Examples of alkenylphenones having this structure include:

Phenyl 1-(methoxymethyl)vinyl ketone, o-methylphenyl 1-(methoxymethyl)vinyl ketone, m-methylphenyl 1-(methoxymethyl)vinyl ketone, p-methylphenyl 1-(methoxymethyl)vinyl ketone, o-ethylphenyl 1-(methoxymethyl)vinyl ketone, m-ethylphenyl 1-ethoxymethyl)vinyl ketone, p-ethylphenyl 1-(methoxymethyl)vinyl ketone, o-chlorophenyl 1-methoxymethyl)vinyl ketone, m-chlorophenyl 1-(methoxymethyl)vinyl ketone, p-chlorophenyl 1-(methoxymethyl)vinyl ketone, o-methoxyphenyl 1-(methoxymethyl)vinyl ketone, m-methoxyphenyl 1-(methoxymethyl)vinyl ketone, p-methoxyphenyl 1-methoxymethyl)vinyl ketone, o-ethoxyphenyl 1-(methoxymethyl)vinyl ketone, m-ethoxyphenyl 1-(methoxymethyl)vinyl ketone, p-ethoxyphenyl 1-(methoxymethyl)vinyl ketone, 2,3-dimethylphenyl 1-(methoxymethyl)vinyl ketone, 2,4-dimethylphenyl 1-(methoxymethyl)vinyl ketone, phenyl 1-(ethoxymethyl)vinyl ketone, o-methylphenyl 1-(ethoxymethyl)vinyl ketone, m-methylphenyl 1-(ethoxymethyl)vinyl ketone, p-methylphenyl 1-(ethoxymethyl)vinyl ketone, o-ethylphe-nyl 1-(ethoxymethyl)vinyl ketone, m-ethylphenyl 1-(ethoxymethyl)vinyl ketone, p-ethylphenyl 1-(ethoxym-ethyl)vinyl ketone, o-chlorophenyl 1-(ethoxymethyl)vinyl ketone, m-chlorophenyl 1-ethoxymethyl)viny 1 ketone, p-chlorophenyl 1-(ethoxymethyl)vinyl ketone, o-methoxy-phenyl 1-(ethoxymethyl)vinyl ketone, m-methoxyphenyl 1-(ethoxymethyl)vinyl ketone, p-methoxyphenyl 1-(ethoxymethyl)vinyl ketone, o-ethoxyphenyl 1-(ethoxym-ethyl)vinyl ketone, m-ethoxyphenyl 1-(ethoxymethyl)vinyl ketone, p-ethoxyphenyl 1-(ethoxymethyl)vinyl ketone, 2,3-dimethylphenyl 1-(ethoxymethyl)vinyl ketone, 2,4-dimethylphenyl 1-(ethoxymethyl)vinyl ketone.

Synthesis of Polycyclic Diquaternary Quinoxaline

Polycyclic Diquaternary Quinoxaline can be produced using commercially available reagents. O-phenylenediamine and its various derivatives can be reacted with dicarbonyl compounds such as glyoxal to produce the quinoxaline. Non-limiting examples of dicarbonyl compounds include glyoxal, phthalaldehyde and benzil. Preferably the polycyclic diquaternary quinoxaline is produced by reacting the cyclic halide with quinoxaline in alcohol as the solvent. Preferrably the alcohol is methanol.

Various solvents exemplified by the non-limiting examples include methanol, ethanol, water-alcohol, ethyl acetate, chloroform and acetonitrile to name a few. A 1:1 molar ratio of reactants is combined and mixed to produce a solution of quinoxaline. To the solution of quinoxaline, a supra-stoichiometric amount of cyclic halide (e.g. benzyl chloride, benzoyl chloride, chloromethyl naphthalene) is added and mixed. An optional catalyst such as iodide and/or heating (>60° C.) accelerates the reaction resulting in the production of the polycyclic diquaternary quinoxaline.

A supra-stoichiometric amount of cyclic halide is added to provide greater than a 1.2:1 molar ratio of cyclic halide to quinoxaline respectively. Preferably, the supra-stoichiometric amount of cyclic halide is greater than or equal to a 2:1 ratio of cyclic halide to quinoxaline respectively.

Synthesis of Oxidative Coupling Product

The methods of synthesis being disclosed are not meant to limit the invention in any way. They are non-limiting examples to illustrate a pathway toward the viable production and commercialization of the OCPs.

OCPs originate from the reaction of either pyridinium and/or quinolinium with benzyl chloride. The resulting quaternary pyridinium and quaternary quinolinium are then reacted using oxidative coupling reaction to produce the oxidative coupling product. Other heterocyclic precursors exemplified by imidazoline may be suitable as well.

A novel method is disclosed that utilizes acid ($H^+$ donor) activated nitrite to form nitrous acid. Nitrous acid is a weak acid having a reported pKa value of about 3.3. As a weak acid there is an equilibrium established between the protonated nitrous acid and the unprotonated nitrite where a 1:1 ratio of protonated to unprotonated occurs at about a pH of 3.3. The acid used to activate the nitrite to nitrous acid can be a mineral acid or organic acids. Non-limiting examples of acids include: hydrochloric acid, sulfuric acid, phosphoric acid, methanesulfonic acid and formic acid.

When the pH of the solution is lowered to <6, the oxidative coupling reaction is observed over time but at a relatively slow rate. As more acid is added and the pH is further lowered, nitrous acid concentrations increase and the rate of the oxidative coupling reaction increases. When the pH is reduced to below the pKa of $HNO_2$ (~3.3) value, the rate of oxidative coupling is accelerated dramatically. As illustrated in the synthesis examples, when the pH was lowered to below the pKa value the rate of change in color and depth of color (darkness) of the reacting solution was almost instantaneous. The transition from a brown solution to a red-black solution occurred over a period of seconds. Therefore, the speed of the synthesis can be controlled by adjusting the addition of acid to increase the conversion of nitrite to nitrous acid and its various decomposition products that drive the oxidative coupling reaction. Furthermore, implementing process control to automatically feed the acid to target a pH would be a viable means of minimizing production time and may allow for a continuous production process as opposed to a batch process.

Figure 3:
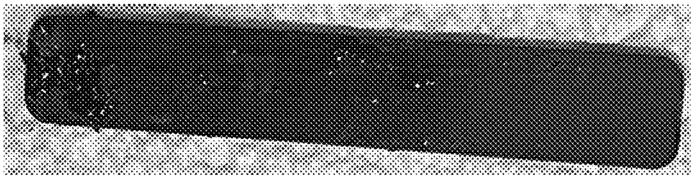
FIG. 3 illustrates a uniform hydrophobic film coating on a C1010 Carbon Steel specimen after 4 hours at 208° F. of exposure in 15 wt % HCl treated with 5 gpt Phalanx II and 5 gpt Conditioner.
Figure 4:
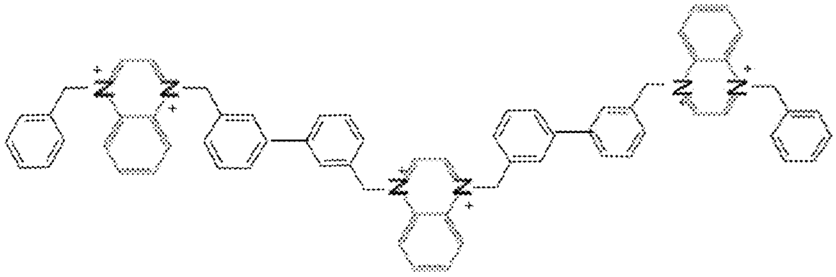
FIG. 4 illustrates an oxidative coupling product (OCP) comprising linked polycyclic diquaternary quinoxaline using the oxidative coupling reaction. The OCP illustrates an example of a polyquaternary compound that when combined with acid and an effective amount of an alkenylphenone produces an inhibited acid that is compatible with stainless steel shipping containers (tankers).

The amount of nitrite donor is preferably greater than or equal to 0.2 mole, more preferred greater than or equal to 0.5 mole and most preferred greater than or equal to 1 mole nitrite donor per mole of quaternary corrosion inhibitor (QCI). The oxidative coupling reaction only requires one of the two QCI molecules to be oxidized to initiate the linkage between the two QCI molecules as illustrated in FIG. 3. Theoretically, oxidizing 50% of the QCI molecules is sufficient to produce 100% of the targeted oxidative coupling product. However, the ability to control which molecules are oxidized and which one are not is not obtainable. Excess oxidation can induce coupling of multiple QCI molecules leading to the formation of a tar like precipitate. Additional solvent and/or selection of more suitable solvent such as glycol ether readily dissolves the higher molecular weight OCP as illustrated in the examples. A nitrite donor molar ratio of about 0.2 to 4 per mole of QCI is a suitable range for synthesis of the OCP using the method disclosed, but this proposed range is not meant to be a limiting factor.

Solvents for producing and formulating compositions comprising CAPs may include non-limiting examples: alcohols, water, acetone, ethylene glycol monobutyl ether, glycols, glycol ethers, DMSO and the like. Preferred solvents comprise mixtures exemplified by glycol ether, alcohol and water.

The nitrite donor can comprise any source of nitrite exemplified by the non-limiting examples sodium nitrite, potassium nitrite, lithium nitrite and the like. The amount of nitrite to produce the oxidative coupling product is greater than or equal to 0.2 mole per mole of quaternary pyridinium and/or quaternary quinolinium reactants use to produce the OCPs. Preferably the amount of nitrite donor is greater than or equal to 0.5 mole and more preferred greater than or equal to 1 mole per mole of quaternary corrosion inhibitor.

Acid addition is used to in-situ generate nitrous acid from the nitrite donor. Preferably only enough acid is added to acidify the OCP producing solution to provide and sustain an effective amount of nitrous acid to drive the oxidative coupling reaction in a controlled manner. Therefore, controlling the amount of nitrite donor and acidity (i.e. pH) are useful in optimizing the production of the targeted OCP. Without being bound by theory, higher molar ratios of nitrite donor may result in higher molecular weight OCPs by linking two or more quaternary aromatic corrosion inhibitors together. It is believed the resulting OCPs maintain their charge density by retaining the quaternary functionality on the original quaternary aromatic corrosion inhibitor. As disclosed, additional acid that causes the pH to approach or go below the pKa of nitrous acid accelerates the rate of the oxidative coupling reaction.

Methods

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perforate operations, the isolation plug is set in the well, the casing is perforated by a tool (guns), then the tool is pulled out of the hole and then acid is pumped and circulated to the perforations (this process can take hours in some extreme cases) and once a feed rate is reached, they begin the stimulation for that stage of the well. The process is then repeated (over 40 to 100 or more stages in many cases).

According to a preferred embodiment of the present invention, the method allows for an operator to pump the tools down with the spearhead acid to perforate the zone and let the acid sit over the perforations or perforate in the acid. This is followed by the removal of the tool from the wellbore and initiating of the stimulation immediately following the perforating tools removal, thereby greatly increasing the efficiency of the operation by removing an entire step from the common process.

According to a preferred embodiment of the present invention, this method can save up to one (1) hour per stage at an average cost of $20,000/hr (for the stimulation crew and equipment) and 30-50 $m^3$ (8000-13,250 gallons) of water per stage depending on depth, casing size and final method. In an average 50-stage well, this can translate into savings of up to or over $1,000,000 in time plus the saved water of up to or over 800,000 gallons. The potential savings from the implementation of this method in operations in the North America alone could reach upwards of several hundreds of millions of dollars per year for the industry and billions of gallons of water saved.

Hydrochloric acid (HCl) is the most commonly used acid in stimulation or for spearhead acid. With this in mind, one must understand that perforation tools and the deployment wireline systems are mostly comprised of stainless metal to ensure longevity and offer the highest level or performance. Conventional plug and perforation processes require the removal of the perforation guns immediately after the perforation stage otherwise the spearhead acid could compromise the perforating guns and deployment wireline systems because of their propensity to attack stainless-metal and stainless-metal alloys. A critical factor in allowing a process to have stainless metal predominate components exposed to strong acids such as HCl is the ability to control or minimize corrosion to a level below which would normally render a stainless-metal tool and wireline deployment system unusable after only a few cycles (or even less in some cases). With the development of a novel corrosion inhibitor which affords substantial long-term acidic exposure protection of stainless metal or such acid sensitive alloys from damage from exposure to hydrochloric acid (HCl), there is a never-seen-before industrial or industry-widescale possibility of removing a time and water consuming step of the pre-stimulation process, thereby saving substantial time, money and water resources. The advantages are compounded when using optimal acidic compositions (i.e. effectiveness and corrosion inhibition) as more wells and more perforation operations can be carried out. The savings are compounded by the number of operations which are carried out without replacing the bottom hole assembly and/or the wireline/slickline or coiled tubing or applicable conveyance method. For this reason, a new generation of corrosion inhibitor for use during acidizing a wellbore is needed.

The compositions and methods disclosed provide superior corrosion inhibition and well as significantly improved economics when compared to the corrosion inhibitors disclosed in the prior art.

Synthesis of Polycyclic Diquaternary Quinoxaline

The following examples are methods used to produce Quinoxalinium, 1,4-bis(phenylmethyl)-, chloride (1:2).

Example 1

A ceramic dish containing water and a layer of silicone oil was placed on a stirring hot plate. A 420 ml glass pressure vessel was placed into the water bath and secured. A stirring rod was inserted and 100 ml of ethanol was added followed by 20.0 g of O-phenylenediamine. While mixing 21.15 ml of 40% glyoxal was added. The solution turned amber in color as the diamine dissolved producing the quinoxaline solution. The solution was allowed to stir and react for 30 minutes, then 42.5 ml (46.83 g) of benzyl chloride was added. The pressure vessel was sealed and the hot plate was set to 100° C. which brought the temperature of the water bath to 70° C. The solution was allowed to react at temperature for about 5 hrs, then the heat was turned off allowing the blue-black solution to mix and cool overnight. 170.69 g of polycyclic diquaternary quinoxaline was recovered. The density was determined to be 1.01 g/ml. The sample was labeled Gemini 2:1 reflecting the molar ratio of benzyl chloride to quinoxaline.

Coupon Testing

C1010 carbon steel coupons were used for the initial testing. Acidizing samples were prepared using 15 wt % HCl and treated with the appropriate corrosion inhibitors and intensifiers as disclosed resulting in beakers containing approximately 190 ml of acidizing solution. The samples were placed in a water bath, the water coated with a layer of silicone oil to retain heat. A thermometer in a sealed water filled jar was used to monitor the liquid temperature in the samples. A digital heater was set at 300° C. to begin heating the samples. Once the sample temperatures reached 90° C., the coupons were inserted to the beakers and covered. The heater was reduced to 210° C. which sustained 98-100° C. consistently throughout the duration of the test. The test duration of 4 hours began when the sample temperature exceeded 90° C.

TABLE 1

| | 1V | 2V |
|---|---|---|
| Stock 15% HCl | 185 ml | 185 ml |
| Gemini-2:1 | 4.0 ml | 4.0 ml |
| KI | 0.65 ml | 1.3 ml |
| Start Wt | 12.22 | 12.11 |
| End Wt | 12.01 | 11.91 |
| Delta Wt | 0.21 | 0.2 |
| wt % | 1.72% | 1.65% |
| Metal loss ($lbm/ft_2$) | 0.02 | 0.02 |

The coupons were retrieved exposing a bright bluish-green solution in the beakers which is extremely uncharacteristic. The metal loss was well below the NACE SP21469-2021 standard of 0.051 $bm/ft^2$.

Another series of coupon test were conducted using different intensifiers for comparison following the same testing protocol and duration.

TABLE 2

| | 1W | 2W | 3W | 4W | 5W |
|---|---|---|---|---|---|
| Stock 15% HCl | 185 ml | 185 ml | 185 ml | 185 ml | 185 ml |
| Gemini 2:1 | 4.0 ml | 4.0 ml | 4.0 ml | 4.0 ml | 4.0 ml |
| KI | 0.65 ml | 0.65 ml | NA | NA | NA |
| Formaldehyde | 0.6 ml | NA | NA | NA | NA |
| Formic Acid | NA | 0.5 ml | NA | 0.5 ml | NA |
| H2O2 | NA | NA | NA | NA | 3.5 ml |
| Start Wt | 12.22 | 12.28 | 12.21 | 12.34 | 12.25 |
| End Wt | 11.94 | 12.08 | 11.89 | 12.04 | 11.90 |

TABLE 2-continued

| | 1W | 2W | 3W | 4W | 5W |
|---|---|---|---|---|---|
| Delta Wt | 0.28 | 0.20 | 0.32 | 0.30 | 0.35 |
| wt % | 2.29% | 1.63% | 2.62% | 2.43% | 2.86% |

The coupons were retrieved exposing a bright bluish-green solution in the beakers. After washing the coupons in EB Solvent followed by methanol, coupon 1W retained a black uniform film across the entire surface. All of the coupons were very smooth indicating no obvious pitting. It appeared the coupons had undergone an initial period of corrosion, followed by the establishment of a uniform protective film. Furthermore, while sample 3W did not comprise an additional initiator, its performance was comparable to the remaining samples that included initiators. Without being bound by theory, the high charge density resulting from the diquaternary functionality compensated for the lack of supporting initiator.

C1010 carbon steel coupon testing was repeated using the same testing protocol, however the duration of the test was extended to 8 hours.

TABLE 3

| | 1X | 2X | 3X | 4X |
|---|---|---|---|---|
| Stock 15% HCl | 185 ml | 185 ml | 185 ml | 185 ml |
| Gemini 2:1 | 4.0 ml | 4.0 ml | 4.0 ml | 4.0 ml |
| KI | 0.65 ml | 0.65 ml | 0.65 ml | 0.65 ml |
| Formaldehyde | 0.6 ml | NA | NA | NA |
| Formic Acid | NA | 0.5 ml | 2.0 ml | NA |
| Start Wt | 12.22 | 12.23 | 12.26 | 12.15 |
| End Wt | 12.03 | 12.04 | 12.07 | 11.91 |
| Delta Wt | 0.19 | 0.19 | 0.19 | 0.24 |
| wt % | 1.56% | 1.59% | 1.56% | 1.98% |

The results of the 8 hour testing illustrate that once the protective film is established, further corrosion is inhibited.

Example 2

A new batch of polycyclic diquaternary quinoxaline was produced using a 1.95:1 molar ratio of benzyl chloride to tertiary amine content in the quinoxaline. This approach allowed a slight residual of tertiary amine to remain unreacted, thereby driving the reactions toward the depletion of benzyl chloride. Furthermore, the temperature was increased and the duration of the reaction was extended to 24 hours.

A ceramic dish containing water and a layer of silicone oil was placed on a stirring hot plate. A 420 ml glass pressure vessel was placed into the water bath and secured. A stirring rod was inserted and 150 ml of methanol was added followed by 30.0 g of O-phenylenediamine. While mixing 31.73 ml of 40% glyoxal was added. The solution turned amber in color as the diamine dissolved producing the quinoxaline solution. The solution was allowed to stir and react for 20 minutes, then 62.27 ml (68.5 g) of benzyl chloride was added. The pressure vessel was sealed and the hot plate was set to 125° C. which brought the temperature of the water bath to 74° C. The solution was allowed to react at temperature for about 24 hrs, then the heat was turned off allowing the black solution to mix and cool overnight. 257.29 g of polycyclic diquaternary quinoxaline was recovered. The sample was labeled Gemini 1.95:1 reflecting the molar ratio of benzyl chloride to quinoxaline.

Coupon Test

C1010 carbon steel coupon testing was repeated using the same testing protocol using a water bath having a silicone oil layer to suppress evaporation and sustain temperature at 100° C. The test duration was 8 hours.

TABLE 4

| | | |
|---|---|---|
| Stock 15% HCl | 185 ml | 185 ml |
| Gemini 1.95:1 | 4.0 ml | 4.0 ml |
| KI | 0.65 ml (~390 ppm $I^-$) | 6.65 ml (1:1 $I^-$:$N^+$) |
| Start Wt | 12.20 g | 12.28 g |
| End Wt | 12.00 g | 12.22 g |
| Delta Wt | 0.20 g | 0.06 g |
| wt % | 1.64% | 0.49% |
| Metal Loss | 0.019 lbm/$ft^2$ | 0.006 lbm/$ft^2$ |

Two different iodide concentrations were tested to determine the effect on corrosion rate. Surprisingly the high iodide concentrations that achieved a 1:1 molar ratio of Iodide to quaternary group dramatically reduced the corrosion rate.

Another series of 8 hr test were conducted using 1:1 molar iodide:quaternary group with different concentrations of Gemini 1.95:1.

TABLE 5

| | | | |
|---|---|---|---|
| Stock 15% HCl | 185 ml | 185 ml | 185 ml |
| Gemini 1.95:1 | 2.0 ml | 3.0 ml | 4.0 ml |
| KI (15% KI) | 3.35 ml | 5.00 ml | 6.70 ml |
| Start Wt | 12.23 g | 12.28 g | 12.23 g |
| End Wt | 12.07 g | 12.22 g | 12.18 g |
| Delta Wt | 0.16 g | 0.06 g | 0.05 g |
| wt % | 1.31% | 0.49% | 0.41% |
| Metal Loss | 0.015 lbm/ft2 | 0.006 lbm/ft2 | 0.005 lbm/ft2 |

The data clearly demonstrates the higher iodide concentration increases the corrosion inhibition of the Gemini 1.95:1 thereby allowing for reduced concentrations while providing corrosion inhibition well below the accepted 0.051 bm/$ft^2$.

Another series of corrosion test were conducted on P110 coupons at 250° F., 3000 psig for 12 hours at temperature. The inhibited acid comprised 15 wt % HCl with 15 gpt Gemini 1.95:1 and 1300 ppm KI.

| Coupon | Initial (g) | Final (g) | Weight loss lb/ft2 | Pitting |
|---|---|---|---|---|
| 10 | 12.7370 | 12.6259 | 0.0115 | none |
| 1 | 13.3253 | 13.2127 | 0.0117 | none |

Synthesis of Oligomers of Polycyclic Diquaternary Quinoxaline

To a 250 ml round bottom flask mounted on a magnetic stirrer with stirring rod, 20 ml of EB Solvent was added followed by 1 ml of 90% Formic acid and 20 ml of Gemini 1.95:1 (approximately 44.5% active). While stirring, and solution comprising 30 ml R.O. water and 6 g $KNO_2$ was slowly dripped into the stirring solutions over a period of 20 minutes. The combined mixture was allowed to react overnight resulting in the black solution comprising oligomers of polycyclic diquaternary quinoxaline.

Synthesis of Polycyclic Diquaternary Quinoxaline with Benzyl Iodide

To a round bottom flask mounted on a magnetic stirrer, 65 ml acetone, 65 ml benzyl chloride and 84.67 g sodium iodide crystals were added and mixed for approximately 30 minutes. A thick slurry developed along with a noticeable exotherm. The slurry was diluted with 150 ml of RO water and mixed to dissolve the salt (NaCl). After mixing, the solution was added to a separating funnel and allowed to rest for approximately 5 minutes. After the dark benzyl iodide separated from the aqueous phase to the bottom of the funnel, the benzyl iodide was collected. Approximately 75 ml was recovered.

A ceramic dish containing water and a layer of silicone oil was placed on a stirring hot plate. A 420 ml glass pressure vessel was placed into the water bath and secured. A stirring rod was inserted and 150 ml of methanol was added followed by 30.0 g of O-phenylenediamine. While mixing 21.75 ml of 40% glyoxal was added. The solution turned amber in color as the diamine dissolved producing the quinoxaline solution. The solution was allowed to stir and react for 15 minutes, then 75 ml of the recovered benzyl iodide was added. The pressure vessel was sealed and the hot plate was set to 300° C. which brought the temperature of the water bath to 60° C. The hot plate temperature was then set to 120° C. allowing the temperature reach equilibrium at 74° C. The solution was allowed to react at temperature for about 20 hrs, then the heat was turned off allowing the blue-black solution to mix and cool.

Limestone Digestion

Samples of various acidizing compositions were heated in a water bath to 66° C. (150° F.). Sample volumes comprised 185 ml of 15 wt % HCl into which the other additives were added. Indiana limestone samples were obtained and cut from a slab to obtain samples of approximately the same geometry and weight. A Nalgene sample bottle containing the heated sample to be tested was weighed then zeroed. The pre-weighed limestone sample was dropped into the heated sample and time was monitored while recording the remaining weight of the limestone sample in 1-minute increments. The accumulated weight loss was plotted to compare the trajectory of the slopes over time.

The results illustrate the slope of the inhibited acidizing solutions can be altered to either increase or decrease the rate of limestone digestion while the Control showed a rapid initial dissolution rate followed by a declining slope. The inhibited acids demonstrated a more methodical dissolution rate with the OCP demonstrating a near linear slope.

Synthesis of Alkenylphenone

A ceramic dish containing water and a layer of silicone oil was placed on a stirring hot plate. A 420 ml glass pressure vessel was placed into the water bath and secured. A stirring rod was inserted and 100 ml of methanol was added followed by 0.84 g of NaOH beads. While mixing 58.35 ml (60.08 g) Acetophenone was added followed by 30.2 g paraformaldehyde. 5 ml of MeOH was added to rinse paraformaldehyde from the wall of the vessel. The pressure vessel was sealed and the water bath was heated to 40° C. while mixing for approximately 24 hours. After 24 hrs the clear solution resulted in a white solution of 2-benzoyl-3-methoxy-1-propene. The recovered solution was designated "Conditioner".

Synthesis of Polycyclic Diquaternary Quinoxaline

A ceramic dish containing water and a layer of silicone oil was placed on a stirring hot plate. A 420 ml glass pressure vessel was placed into the water bath and secured. A stirring rod was inserted and 100 ml of methanol was added followed by 35.2 g quinoxaline. While mixing 68.5 ml (~75.32 g) benzyl chloride was added. The pressure vessel was sealed and the water bath was heated to 70-75° C. while mixing for approximately 20 hours. After cooling, 10 wt % of Brij CS25 (C16-18 ethoxylated alcohols) supplied by Croda Inc., was added and mixed for approximately 2 hours. The recovered solution was designated "Phalanx II".

Testing the Phalanx II and Conditioner

Results of C1010 low carbon steel coupons exposed to 15 wt % HCl treated with 5 gpt Phalanx II and 5 gpt Conditioner. Duration was 4 hours at 208° F. After exposure at temperature for 4 hours, the coupons were removed, rinsed with water, washed with methanol, dried then weighed.

| C-1010 | |
|---|---|
| Stock 15% HCl | 150 ml |
| Phalanx II (5 gpt) | 0.75 ml |
| Conditioner (5 gpt) | 0.75 ml |
| KI (20 wt %) | NA |
| Start Wt | 11.79 g |
| End Wt | 11.72 g |
| Delta Wt | 0.07 g |
| wt % | 0.59% |

Results of hot dipped galvanized specimens exposed to 15 wt % HCl treated with 5 gpt Phalanx II and 5 gpt Conditioner. Duration was 4 hours at 208° F. After exposure at temperature for 4 hours, the coupons were removed, rinsed with water, washed with methanol, dried then weighed.

| Galvanized | | |
|---|---|---|
| Stock 15% HCl | 150 ml | 150 ml |
| Phalanx II (5 gpt) | 0.75 ml | 0.75 ml |
| Conditioner (5 gpt) | 0.75 ml | 0.75 ml |
| KI (20 wt %) | NA | 0.5 ml |
| Start Wt | 116.51 g | 117.78 g |
| End Wt | 114.26 g | 114.82 g |
| Delta Wt | 2.25 g | 2.96 g |
| wt % | 1.93% | 2.51% |

Results of 316 stainless steel specimens exposed to 15 wt % HCl treated with 5 gpt Phalanx II and 5 gpt Conditioner. Duration was 4 hours at 208° F. After exposure at temperature for 4 hours, the coupons were removed, rinsed with water, washed with methanol, dried then weighed.

| 316SS | | |
|---|---|---|
| Stock 15% HCl | 150 ml | 150 ml |
| Phalanx II (5 gpt) | 0.75 ml | 0.75 ml |
| Conditioner (5 gpt) | 0.75 ml | 0.75 ml |
| KI (20 wt %) | NA | NA |
| Start Wt | 16.32 g | 16.37 g |
| End Wt | 16.31 g | 16.36 g |
| Delta Wt | 0.01 g | 0.01 g |
| wt % | 0.06% | 0.06% |

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. An acid composition for acidizing a wellbore, the composition comprising:

at least one acid;

an effective amount of an alkenylphenone;

an effective amount of polycyclic diquaternary quinoxaline;

the polycyclic diquaternary quinoxaline having the general structure:

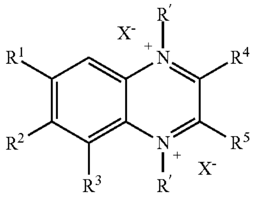

where $X^-$ comprises a counter anion,

R' comprises an alkyl aryl group, and $R^1$, $R^2$, $R^3$, $R^4$ and $R^5$ comprise hydrogen or a substitution group;

the alkenylphenone having the general structure:

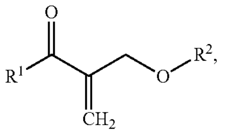

where $R_1$ is an unsubstituted or an inertly substituted aryl having 6 carbon atoms to 10 carbon atoms, and $R_2$ can be a substituted or unsubstituted $C_1$-$C_6$ alkyl group.

2. The acid composition according to claim 1, wherein the alkyl aryl group is selected from at least one of benzyl, benzoyl, vinylbenzyl and methyl naphthalene.

3. The acid composition according to claim 1, wherein $R^1$, $R^2$, $R^3$, $R^4$ and $R^5$ comprise substitution groups selected from: halo, alkyl, aryl and alkyl aryl.

4. The acid composition according to claim 1, wherein the acid composition comprises from 0.5 parts by weight to 5.0 parts by weight of the polycyclic diquaternary quinoxaline for every 1.0 part by weight of the alkenylphenone.

5. The acid composition according to claim 1, wherein the acid composition comprises from 0.5 parts by weight to 2.0 parts by weight of the polycyclic diquaternary quinoxaline for every 1.0 part by weight of the alkenylphenone.

6. The acid composition according to claim 1, wherein the counter anion comprises at least one of a chloride, bromide and iodide.

7. The acid composition according to claim 1, further comprising an intensifier selected from at least one of an iodide donor, an aldehyde and formic acid.

8. The acid composition according to claim 1, wherein the polycyclic diquaternary quinoxaline comprises dibenzyl diquaternary quinoxaline having the general structure:

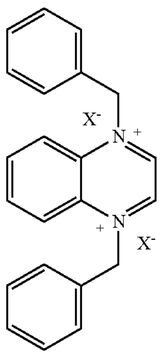

wherein $X^-$ comprises a counter anion.

9. The acid composition according to claim 1, further comprising at least one of a surfactant and hydrotrope.

10. The acid composition according to claim 9, wherein the surfactant comprises an ethoxylate alcohol have from 16-18 carbon atoms in an alkyl chain.

11. The acid composition according to claim 1, wherein the acid comprises 15 wt % HCl.

12. The acid composition according to claim 1, wherein the acid comprises a synthetic acid.

13. The acid composition according to claim 1, wherein the acid comprises a mineral acid selected from at least one of hydrochloric acid, hydrofluoric acid, sulfuric acid and nitric acid.

14. The acid composition according to claim 1, wherein the acid comprises an amount ranging from 5 to 28 wt %.

15. The acid composition according to claim 1, wherein the composition is diluted with water at a point-of-use to achieve a ratio of composition and water of 1:1 respectively.

16. The acid composition according to claim 1, wherein the composition is diluted with water at the point-of-use to achieve a ratio of composition and water of 1:2 respectively.

17. An inhibited acid composition compatible with stainless steel tankers for transporting the inhibited acid composition, the composition comprising:

an acid;

an effective amount of alkenylphenone;

an effective amount of polycyclic diquaternary quinoxaline, and wherein the inhibited acid composition is transported in stainless steel tankers, wherein the alkenylphenone having the general structure:

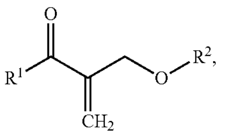

where $R_1$ is an unsubstituted or an inertly substituted aryl having 6 carbon atoms to 10 carbon atoms and $R_2$ can be a substituted or unsubstituted $C_1$-$C_6$ alkyl group;

the polycyclic diquaternary quinoxaline having the general structure:

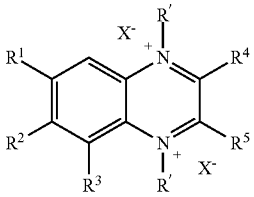
wherein $X^-$ comprises a counter anion,
R' comprises an alkyl aryl group, and
$R^1$, $R^2$, $R^3$, $R^4$ and $R^5$ comprise hydrogen or a substitution group.
* * * * *